United States Patent [19]
Secen et al.

[11] Patent Number: 5,937,688
[45] Date of Patent: Aug. 17, 1999

[54] ADJUSTABLE SIDE GUIDE WITH QUICK CHANGE STRIP HEATER ASSEMBLY

[75] Inventors: Joseph V. Secen; Carmen M. Nicolella, both of Pittsburgh, Pa.

[73] Assignee: SMS Engineering Corporation, Inc., Pittsburgh, Pa.

[21] Appl. No.: 09/136,771

[22] Filed: Aug. 19, 1998

[51] Int. Cl.$^6$ .................................................. B21B 27/06
[52] U.S. Cl. ............................................. 72/202; 72/200
[58] Field of Search .............................. 72/201, 200, 202, 72/364, 128, 342.1; 432/129, 121

[56] References Cited

U.S. PATENT DOCUMENTS

| | | | |
|---|---|---|---|
| 4,154,576 | 5/1979 | Bossetti | 432/128 |
| 4,201,542 | 5/1980 | Bossetti | 432/128 |
| 5,101,652 | 4/1992 | Burk et al. | 72/202 |

Primary Examiner—Joseph J. Hail, III
Assistant Examiner—Rodney Butler
Attorney, Agent, or Firm—Clifford A. Poff

[57] ABSTRACT

A hot metallic workpiece is advanced between side guides extending along opposite lateral sides of a driven roller table for guiding the hot metallic workpiece to a hot mill. Each of the side guides takes the form of a beam section including an elongated horizontal workpiece guide joined to an elongated horizontal back section by web sections horizontally separated one from another and forming a plurality of utility pockets. The elongated horizontal guide has window openings at the pass line communicating with corresponding situated utility pockets each containing a burner to direct hot products of combustion toward the side of a workpiece while advance by the roller table toward a hot mill. A burner carrier supports a group of spaced apart burners with the burners of each group connected to discrete utility lines. A driven screw and stationary nut form a drive operative with each of the plurality of burner carriers to locate each group of burners in an operating position where the burners thereof are aligned with corresponding ones of the window openings to direct products of combustion from the burners for heating opposed lateral sides of a hot metallic workpiece while guided by the elongated horizontal guide and an inoperative position wherein the spaced apart burners of each group are at an elevated position above the window opening along the utility pockets for servicing of the burners of each of the group of burners. Telescoping guide assure unimpeded movement of the burner carrier between the operative and inoperative positions of the burner associated therewith.

24 Claims, 8 Drawing Sheets

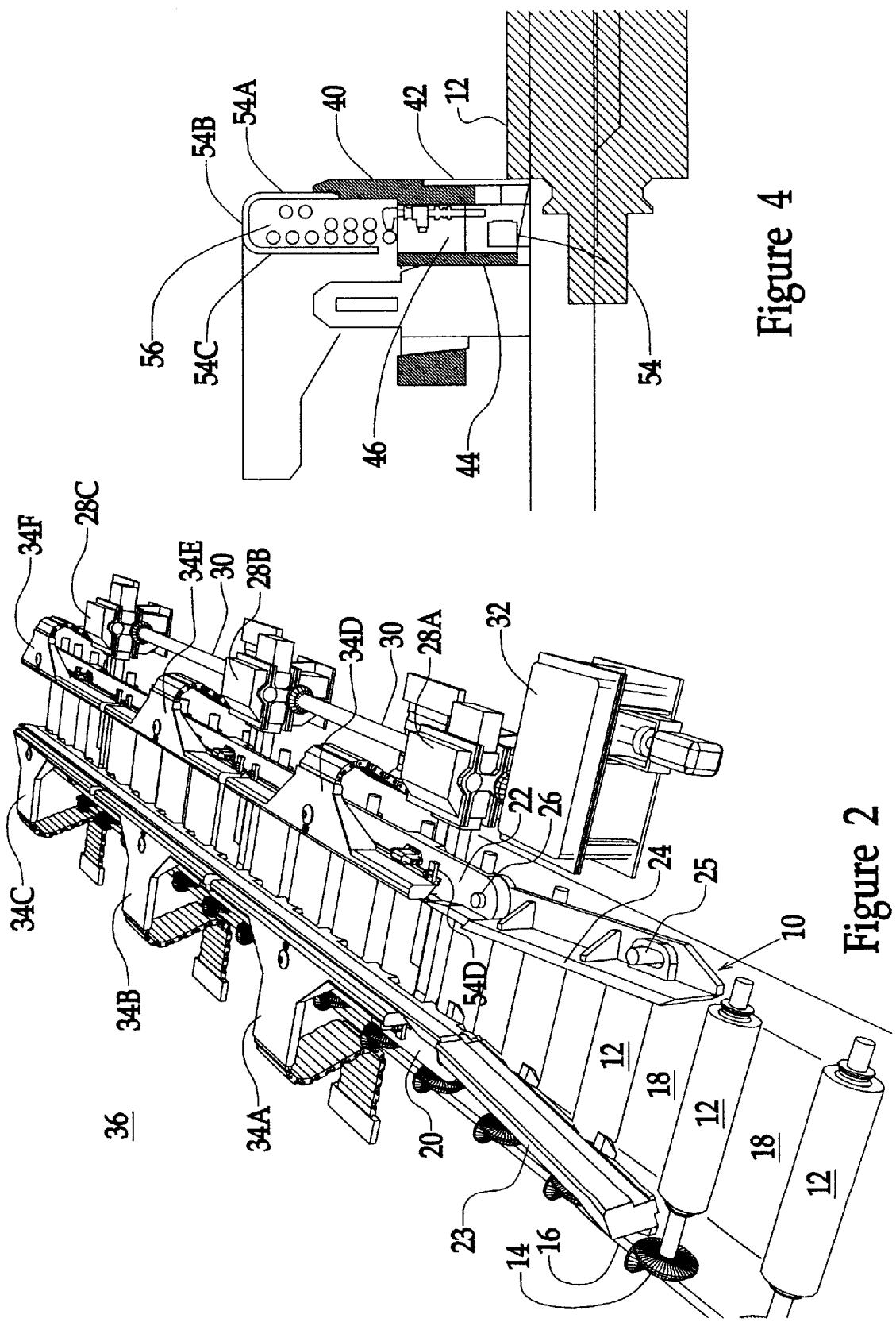

ADJUSTABLE SIDE GUIDE WITH QUICK CHANGE STRIP HEATER ASSEMBLY

BACKGROUND OF THE INVENTION

1. Field of the Invention

The present invention relates to guiding and restoring heat losse to a hot metallic workpiece during advancing movement by a conveyor and, more particularly, to a method and apparatus for providing a carrier to support burners for movement between operable and service positions of which in the operable position the burners direct hot products of combustion from utility pockets through window openings in a side guide toward piece to restore heat to the metallic workpiece and in the service position the carrier including the burners and utility lines therefore are moved to a service position remote to the side guide to allow servicing of the burners and after servicing the burners supported by the carrier are returned to the operable position without disruption to the operation of the side guide and other burners spaced horizontally thereto.

2. Description of the Prior Art

While not so limited, the present invention is particularly useful to offset heat losses in a semi-finished hot mill workpiece before processing in a finishing mill train of a hot mill. Such a hot mill for the purpose of practicing the present invention includes continuous and semi-continuous hot strip mills and hot plate rolling mill. The hot metal workpiece treated according to the method and apparatus of the present invention includes but not limited to steel, aluminum, brass, titanium and beryllium. In a conventional continuous hot strip mill, an example of which is illustrated in FIG. 1A, steel slabs are introduced by pushers P into reheat furnaces F where a succession of slabs are heated to a highly heated state for hot metal working operations. When each slab attains a desired temperature for hot working, the slab is extracted from the furnace and conveyed by a furnace discharge table FDT to a vertical edging mill E, thence to a horizontal edging breaker B and thence to a tandem arrangement of roughing mill stands RMS. The edging mill E imparts a uniform width to the hot slab along the length thereof and the scale breaker B loosens and clears scale from the surface of the slab before the slab is reduced in thickness in the roughing mill stands RMS. The thickness of the slab after hot rolling and emerging from the roughing mill stands is of the order of 1 to 2 inches. After rolling in the roughing mill stands, the hot metal workpiece resides on a holding table HT. The holding table and the tables between the roughing mill stands and the furnace delivery table all incorporate spaced apart table rollers driven by motors to advance the workpiece along the roller tables of the hot mill. Side guides are arranged along the opposite sides of the holding table to center and direct the hot metal workpiece into a crop shear CS which imparts a squaring cut to the leading end of the workpiece before entry into the first mill stand of a tandem arrangement of finishing rolling mill stands FS. The thin hot strip workpiece emerging from the finishing mill stands has a thickness which is determined according to a preset rolling schedule. Coolant water is discharged onto the strip on run out table ROT as the strip is delivered to coilers C. A coil delivery conveyor CDC delivers the coils of hot strip from the coilers of the rolling mill installation for further processing. The holding table HT forms a delay site where the hot metal workpiece resides until an preceding hot metal workpiece is completely discharged from the run out table ROT and coiled by coilers C.

As typically illustrated in FIG. 1B, the hot workpiece residing on the holding table may have a length of 150 to 300 feet or greater and throughout after discharge from the furnace up to and including the delay period on the holding table, the hot metal workpiece undergoes atmosphere cooling. Not only is the hot workpiece residing on the delay table relatively long in relation to thickness, but it is usually at least 2 feet and up to six or more feet wide. Because of the hot metal workpiece takes the form of a relatively thin ribbon shaped workpiece and the transverse cross-sectional configuration is rectangular, unwanted atmospheric cooling is particularly acute at the workpiece edge corners WEC as compared to the central body area CBA of the hot workpiece. The relatively cooler outer edge corners WEC of the workpiece, impede plastic metal flow usually achieved during hot working operations and cause cracks that commonly develop as the workpiece undergoes one or a series of reduction to the thickness to attain the final desired gage in the finishing mill stands FS. The hot strip mill product with the edge cracks that commonly develop under these circumstances must be processed through an edge trimmer or similar process to restore structural integrity to the strip along its entire length. The resulting losses of the strip material due to the trimming operation are representative of significant loss to the economy of the hot strip mill installation, not only because of the metal loss from each coil, but the additional cost for processing represented by the required side trimming operation.

Attempts to maintain a constant temperature across the width of the hot workpiece have not met with success. A tunnel shaped furnace arranged to enclose the length of the hot metal workpiece at the entry side of the rolling mill stands requires an excessive amount of space, restricts access to the area and represents a substantial capital investment. The provision of such a tunnel shaped furnace is impractical particularly as a retrofit furnace to an existing rolling mill installation. Electrical induction heating of the longitudinal side edges of the hot workpiece was successfully demonstrated. However, precise alignment was required between a cavity of a "C" shaped heating die and the edge of a hot metal workpiece. Moreover, the heating dye was exposed to damage by impact upon initial advancing movement by the hot metal workpiece. This is because the leading edge of the workpiece was sometimes bent and distorted and thus precise alignment could not be readily achieved with the dye. As a result, such electrical heating is not practical. As an alternative to electrical heating, acetylene fuel gas heating of the workpiece edge is also effective. Because of the nature of the flame, the Acetylene fueled burners were located at such a close proximity to the edge of the workpiece that the burners were highly susceptible to damage because of mechanical shock, impact and air born debris from the hot metal workpiece. The burners were found to be a high maintenance item and not suitable for operation in hostile operating environment of a hot mill. Acetylene, as a fuel gas, increased significantly the operating cost and combustion of a gas produced intense localized heating imposing demands for critically precise control to avoid workpiece overheating and damage. Moreover, burner maintenance contributed materially to the downtime particularly because access to the burner was precarious and servicing of the burners necessitated the shut down of the hot mill facility and thus loss of production for an extended period of time. Also, the burners were not protectively housed against damage due to impact with the hot metallic workpiece during heating thereof.

Burners designed to heat side edges of a workpiece by producing combustion products using natural gas and oxygen have been tried but were also found to be a high maintenance item and not suitable for operation in hostile operating environment of a hot mill. The burners were secured directly to guides for the hot workpiece. The mounting arrangement was such that access to the burners and the required utilities was restricted and required an inordinate amount of service and maintenance particularly to perform cleaning operations as well as replacement of worn and damaged parts. The burners fueled by natural gas also were not protectively housed against damage due to impact with a hot metallic workpiece during heating thereof.

It is an object of the present invention to provide an improved guide design to guide hot metallic workpieces and provide discrete sites for operating and maintenance of burners used to heat opposed side edges of the hot metallic workpieces for subsequent hot metal processing.

It is a further object of the present invention to provide an improved guide design for hot metallic workpieces incorporating utility pockets communicating with window openings to allow an arrangement of burners in the utility pockets to discharge products of combustion toward opposite edges of the workpiece for heating thereof and positioning of the burners including utility ducts therefore as a unit in an inoperative position for servicing without disrupting the required operation of the guides used for positioning hot metallic workpieces for subsequent hot metal processing.

It is still another object of the present invention to provide a method and apparatus to offset heat losses at corner edges of hot metallic workpieces and eliminate or at least reduce side trimming losses of the subsequently finished metal product heretofore required to eliminate cracked marginal edges.

SUMMARY OF THE INVENTION

According to the present invention there is provided an apparatus to direct and restore heat losses by hot metallic workpiece while advanced by a driven roller table, the apparatus including a beam section including an elongated horizontal guide extending along one side of a pass line for guiding a hot metallic workpiece, the beam section further including an elongated horizontal back section joined by web sections horizontally separated one from another by at least one utility pocket, the elongated horizontal guide having a window opening at the pass line communicating with the utility pocket, a burner carrier supporting at least one burner connected to utility lines, and a drive to selectively position the burner between an operative position wherein the burner is aligned with the window opening to direct products of combustion from the burner for heating a side edge of a hot metallic workpiece while guided by the elongated horizontal guide and an inoperative position wherein the burner is at an elevated position above the window opening along the utility pocket for servicing of the burner.

According to the present invention there is also provided an apparatus to guide and restore heat losses to a hot metallic workpiece while advanced for a hot metal working operation, the apparatus includes side guides extending along opposite lateral sides of a driven roller table for guiding a hot metallic workpiece, each of the side guides being defined by a beam section including an elongated horizontal guide extending along one longitudinal side of a hot metallic workpiece, the beam section further including an elongated horizontal back section joined by web sections horizontally separated one from another by a plurality of utility pockets, the elongated horizontal guide having a window opening at the pass line communicating with each of the plurality of utility pockets, a drive for positioning the side guides adjacent opposite lateral sides of the hot metallic workpiece, a plurality of burner carriers each supporting a group of spaced apart burners with the burners of each group connected to discrete utility lines, and a drive to selectively position each of the plurality of burner carriers wherein the spaced apart burners of each group are aligned with corresponding ones of the window openings to direct products of combustion from the burners of each group for heating opposed lateral sides of a hot metallic workpiece while guided by the elongated horizontal guide and an inoperative position wherein the spaced apart burners of each group are at an elevated position above the window opening along the utility pockets for servicing of the burners of each of the group of burners.

According to the present invention there is further provided a method for guiding and restoring heat losses in a hot metallic workpiece while advanced for a hot metal working operation, the method including the steps of advancing a first hot metallic workpiece to the entrance between opposed side guides at the entry end of a hot rolling mill, positioning the side guides in such close proximity to the opposed edges of the first workpiece to allow combustion products emitting from a plurality of burners exposed by window openings in each of the side guides to heat opposed side edges of the first hot metallic workpiece for offsetting heat losses from the opposed side edges before rolling in the hot rolling mill; processing the first hot metallic workpiece in the hot rolling mill, lifting a select group of burners along utility pockets in the associated side guide from the window openings therein for servicing the resulting elevated group of burners, advancing a second hot metallic workpiece to the entrance between the opposed side guides for processing in the hot rolling mill, heating opposed side edges of the second hot metallic workpiece by locating the side guides in such close proximity to the opposed edges of the second workpiece to cause combustion products emitting from the plurality of burners exposed by window openings in the side guides, except those burners comprising the select group of burners, to offset heat losses before rolling in said hot rolling mill, and lowering the select group of burners in the utility pockets in the associated side guide to register with the window openings therein for causing combustion products toward a side edge of a hot metallic workpiece.

BRIEF DESCRIPTION OF THE DRAWINGS

The present invention will be more fully understood when the following description is read in light of the accompanying drawings in which:

FIG. 2 is an isometric illustration of side guides incorporating edge heaters for a hot metallic workpiece according to a preferred embodiment of the present invention;

FIG. 4 is a sectional view taken along lines IV—IV of FIG. 3;

DETAILED DESCRIPTION OF THE PREFERRED EMBODIMENT

Figure 1A:
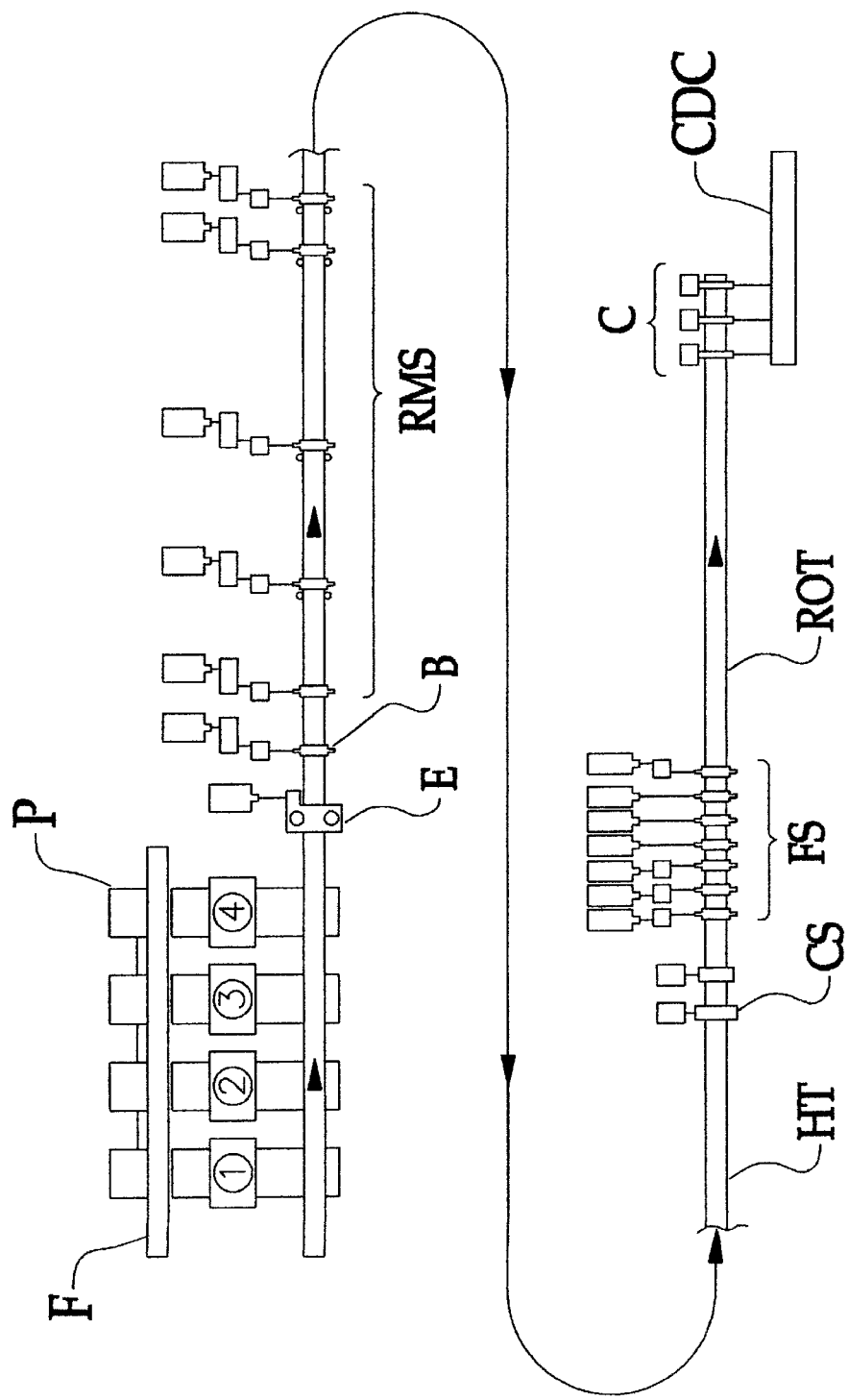
FIG. 1A is a schematic illustration of a prior art typical continuous hot strip mill installation.
Figure 1B:
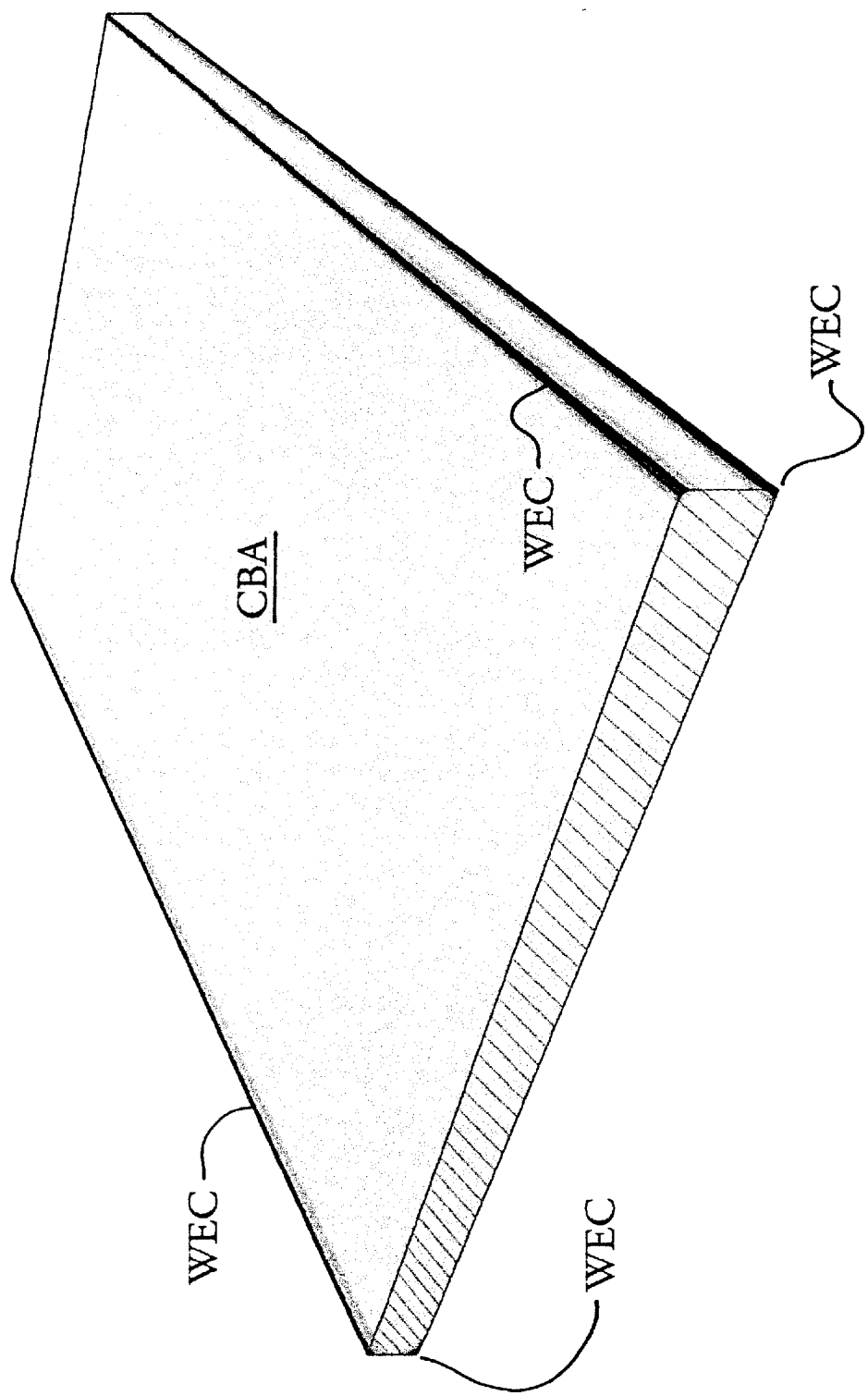
FIG. 1B is a isometric illustration of a typical hot bar usually between 1 to 2 inches thick before rolling in a finishing mill train in a hot strip mill of FIG. 1A.

As described hereinbefore and shown in FIG. 1A, a known form of continuous hot mill includes a holding table HT for supplying hot metallic workpieces at predetermined intervals to a train of finishing rolling mill stands. Such a holding table commonly incorporates spaced apart rollers and such an arrangement of rollers is utilized to convey hot metallic workpieces between side guides incorporating the features of the present invention, the preferred embodiment of which is shown in FIG. 2. In FIG. 2, a roller table 10 includes spaced apart table rollers 12 having journals at opposite ends supported by bearings in a manner per se well known in the art. The table rollers each have a beveled gear 14 having gear teeth in a meshing relation with gear teeth of a beveled gear on a line shaft 16 driven by a motor, not shown. An apron 18 is mounted in the gap between each of the spaced apart table rollers 12. A side guide 20 extends along a length of roller table 10 at the side containing line shaft 16 and at the opposite side of the roller table a side guide 22 is arranged in a generally parallel and coextensive manner with side guide 20. A hot metallic workpiece advanced by the table enters between converging entry guide sections 23 and 24 retained by vertical anchor post 25 and pivotally connected by hinge pins 26 to the upstream ends of side guides 20 and 22, respectively. The side guides are moved synchronously toward and away from each other by rack and pinion actuators 28A, 28B, and 28C which are joined together by drive shafts 30 and simultaneously operated by motor operated gear drive 32. Each of the side guides 20 and 22 incorporate discrete groups of burners coupled by dedicated utility lines supported by a power track 34A, 34B and 34C at the drive side of the roller table and power tracks 34D, 34E and 34F at the side of the roller table opposite thereto. The power tracks 34A–34E provide flexible support for the necessary utility supply lines extending from the mill floor 36 for the operation of the burners of each group and to accommodate the need to laterally position the guides and burners supported thereby relative to the roller table for various widths of hot metallic workpieces.

As best shown in FIGS. 3–7, preferably each side guide is a unitary structure in the form of a beam section which includes an elongated horizontal guide section 40 provided with a wear plate 42 secured in a recess of a horizontal guide section. The wear plate extends along the entire length of the horizontal guide section. The wear plate has a height to extend from a point beneath the pass line of the roller table defined by a plane containing the upper most surface of the rollers to an upper elevation site above the largest hot metal workpiece thickness that will be conveyed by the table. The wear plate is designed to be replaced from time to time to renew the guide surface that may erode due to contact with the hot metal workpiece advanced by the roller table to a downstream hot metal processing equipment such as a train of hot mill finishing stands. Spaced from the horizontal guide section in a generally parallel and co-extending relationship is a horizontal back section 44 joined by web sections 46 (FIGS. 3–5) to the horizontal guide section. The web sections are horizontally separated from one another by gaps that form utility pockets 48 each of which communicate with a window opening 50 in the horizontal guide and permeate through aligned window openings in the wear plate supported thereby. A rectangular shaped burner 52, shown in detail in FIG. 9 and as will be discussed hereinafter, is supported in a position to emit products of combustion in a generally horizontal direction toward an upstanding side edge of a hot metallic workpiece residing and advanced by the roller table 10.

Figure 3:
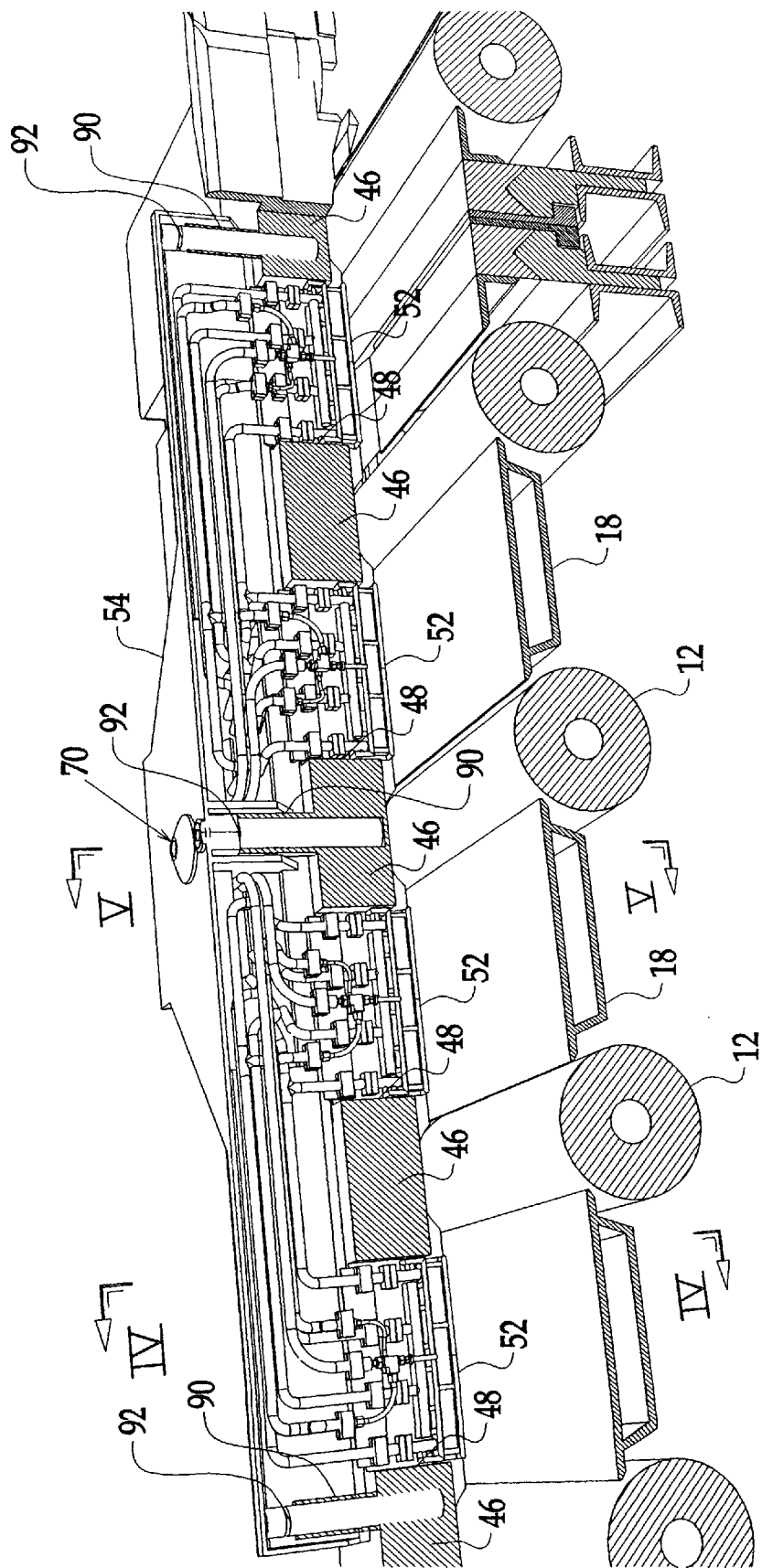
FIG. 3 is an enlarged partial isometric illustration of the side guides as shown in FIG. 2.
Figure 5:
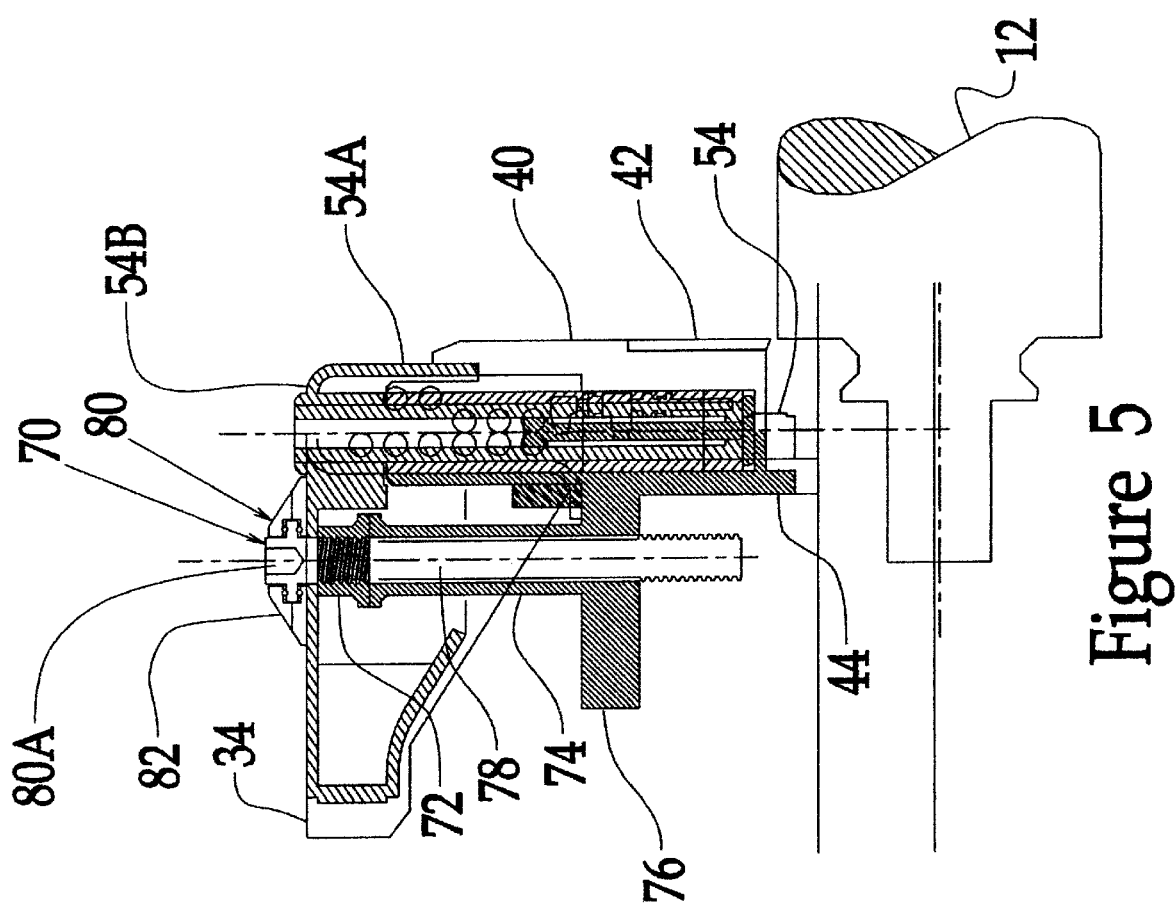
FIG. 5 is a sectional view taken along lines V—V of FIG. 3.

As shown in FIGS. 2 and 3, each power track 34A–34F protectively houses utility lines that extend for support and positioning by each of discrete burner carriers 54. For each power track the utility lines are supported and joined by couplings to piping and electrical lines extending from each burner of a group of burners serviced by the utilities of the respective power track. In FIG. 3, there are four burners 52 connected to the utility lines supplied by a power track. Each burner carrier 54 takes the form of an inverted "U" shape cross section along the length thereof with an outer leg 54A of the "U" shaped cross section resting for support in an inwardly facing recess extending along the upper edge of the horizontal guide 40 (FIGS. 4 and 5). Leg 54A extends to a top wall 54B which forms with an inner leg 54C a protective compartment 56 to house the utility supply lines for the group of burners 52 serviced by the associated utility lines.

Figure 9:
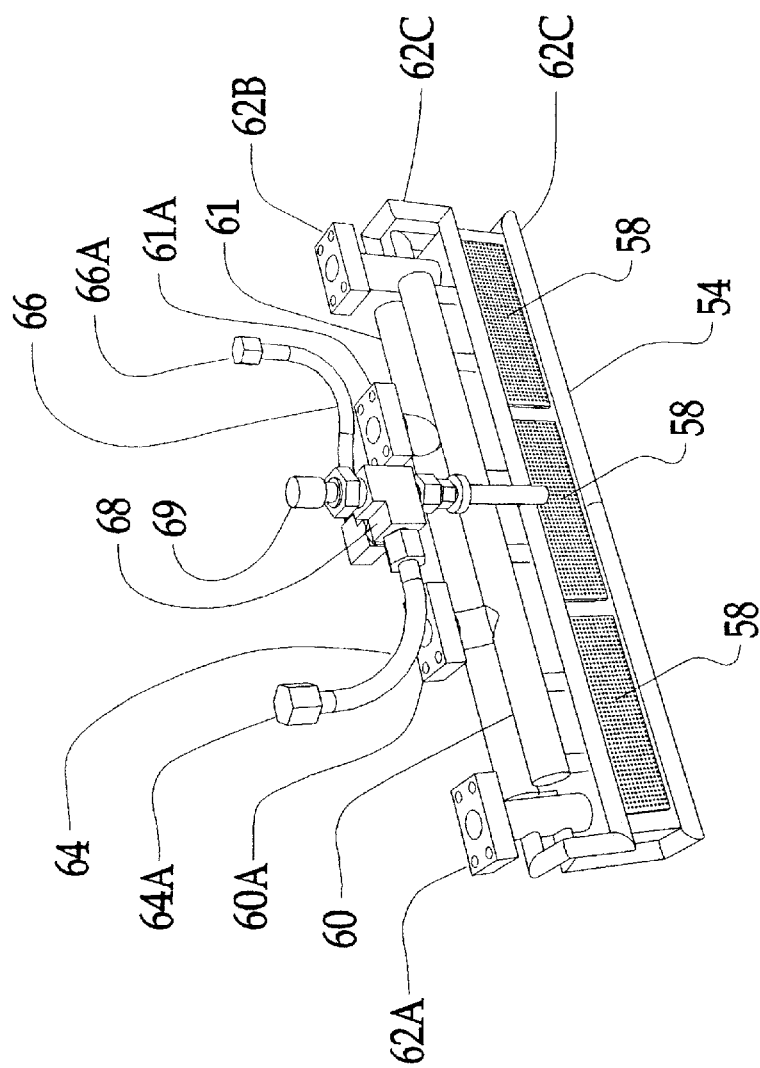
FIG. 9 is an isometric view of a burner assembly according to a preferred embodiment of the present invention.

As shown in FIG. 9, the burner 54 includes an array of three burner nozzles 58 supplied with natural gas by a header 60 through a bolted disconnect flange 60A and oxygen for supporting combustion by the natural as header 61 thorough a bolted disconnect flange 61A. Coolant water is supplied and discharged through bolted disconnect flanges 62A and 62B interconnected by duct work 62C encircling the forward facing edges of the burner which is directed toward the hot metal workpiece to prevent overheating of the burner due to exposure to radiant heat energy emanating from the hot surface of the workpiece. Other utility lines extending to the burner 54 include a gas supply line 64 provided with a bolted disconnect flange 64A and an air supply line 66 provided with a bolted disconnect flange 66A for an ignition burner 68. Current for an ignitor and pilot flame detection are supplied by electric lines extending to a plug connector 70.

An important feature of the present invention resides in the constriction of the burner carrier to position the burners supported thereby in an operative position wherein the burners residing in the respective utility pockets 48 are each aligned with the window openings associated therewith to discharge hot products of combustion for heating the side edges of the hot metallic workpiece and thereby offset heat losses particularly at the edge corners. The burner carrier can be repositioned into a second position remote to the operative position but supported in essentially the same manner by the side guide in both positions. In the second position, the carrier is elevated to extend above the side guide to such an extent that the burners supported thereby are lifted vertically along the utility pockets and exposed so that workman can perform necessary servicing operations for the burner and its component parts shown in FIG. 9 and described hereinbefore. If necessary, a burner can be quickly disconnected from its utility supply lines for replacement or extensive on site servicing.

Figure 6:
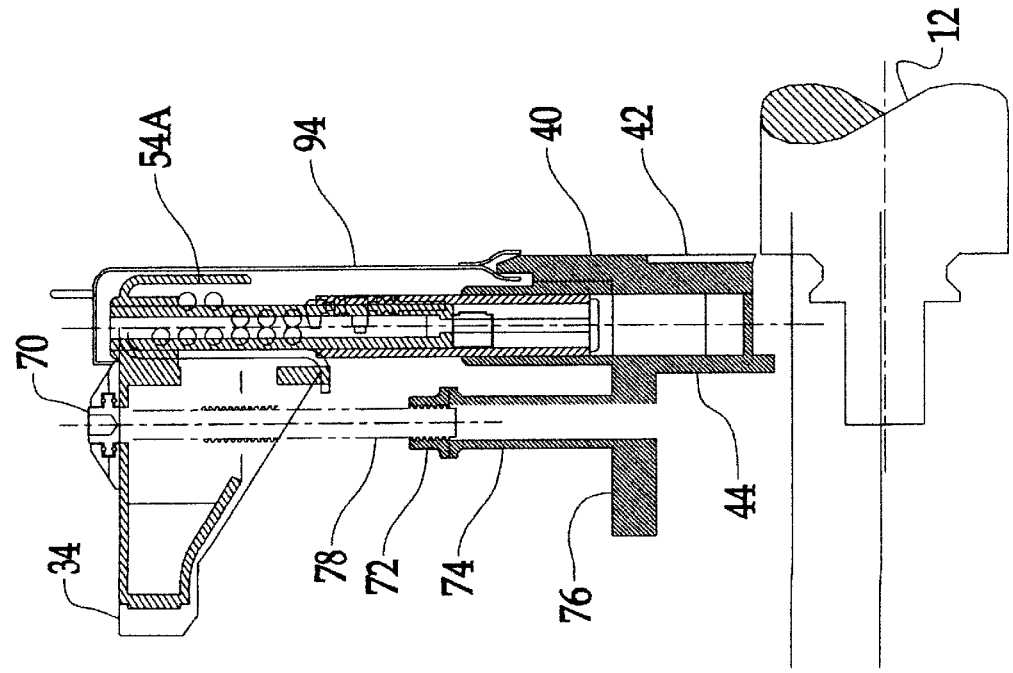
FIG. 6 is a sectional view similar to FIG. 5 and illustrating the burner carrier in a inoperative position for servicing of burners and utility lines forming part of the burner carrier.
Figure 8:
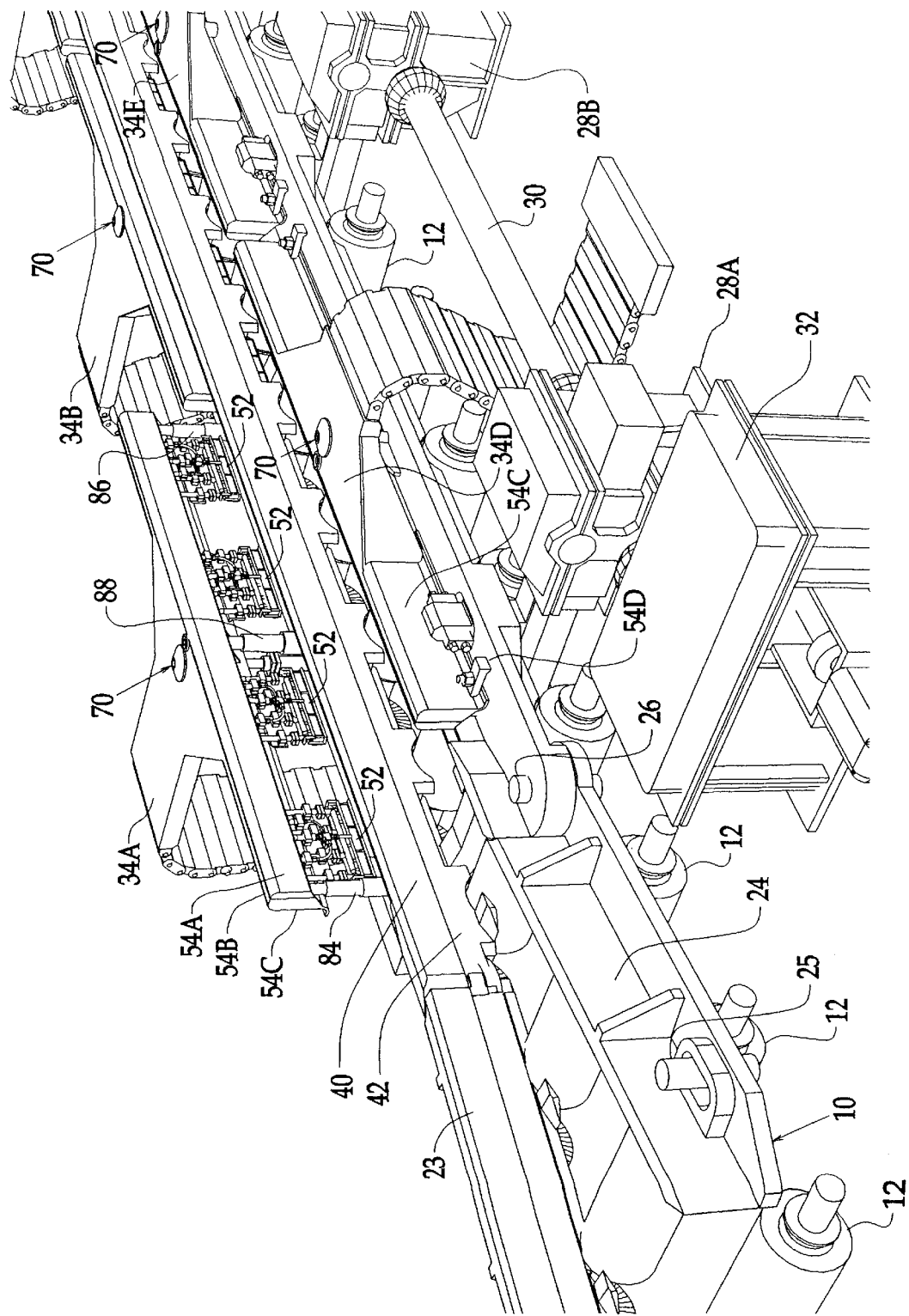
FIG. 8 is an enlarged isometric view similar to FIG. 2 and illustrating a burner carrier in an inoperative position adjacent to a burner carrier in an operative position.

Each burner carrier 54 is independently moved to the operative and service positions for the burners relative to the side guide 20, 22 supported thereby by operation of a screw jack assembly 70. As best shown in FIGS. 5 and 6, the screw jack assembly includes an internally threaded nut 72 supported against rotation by an upstanding tubular carrier section 74 carried on a horizontal base 76 that extends laterally from the back wall 44 of the side guide 20, 22. The internal threads of nut 72 are in mating engagement with external threads extending along an elongated body 78 of a screw having a flanged screw head 80 provided with a socket cavity 80A dimensioned to selectively receive a drive output shaft on a driver preferably in the form of a pneumatically powered wrench, not shown. The flange of the screw head is rotatably supported at opposite sides by thrust bearings in a cavity formed in a split bearing anchor 82. The screw jack assembly 70 is advantageously located at a geometrical center of gravity site in the burner carrier. As shown in FIGS. 3 and 8, to assure uniform vertical movement telescoping guides 84 and 86 extend between opposite ends of the burner carrier and the side guide. Additionally, a centrally located telescoping guide 88 also extends between the burner carrier and the side guide. The telescoping guides 84, 86 and 88 serve to maintain the burner carrier in a generally parallel relation to the guide during movements between elevated and retracted positions. The telescoping guides are identically constructed and each comprise as shown in FIGS. 3 and 8 a cavity formed in the web sections 46 outermost and central to the burner carrier. Each cavity supports an upstanding guide sleeve 90 that in turn slidably supports a guide shaft 92 secured by a fastener, not shown, to the internal face of top wall 54B of the burner carrier.

Figure 7:
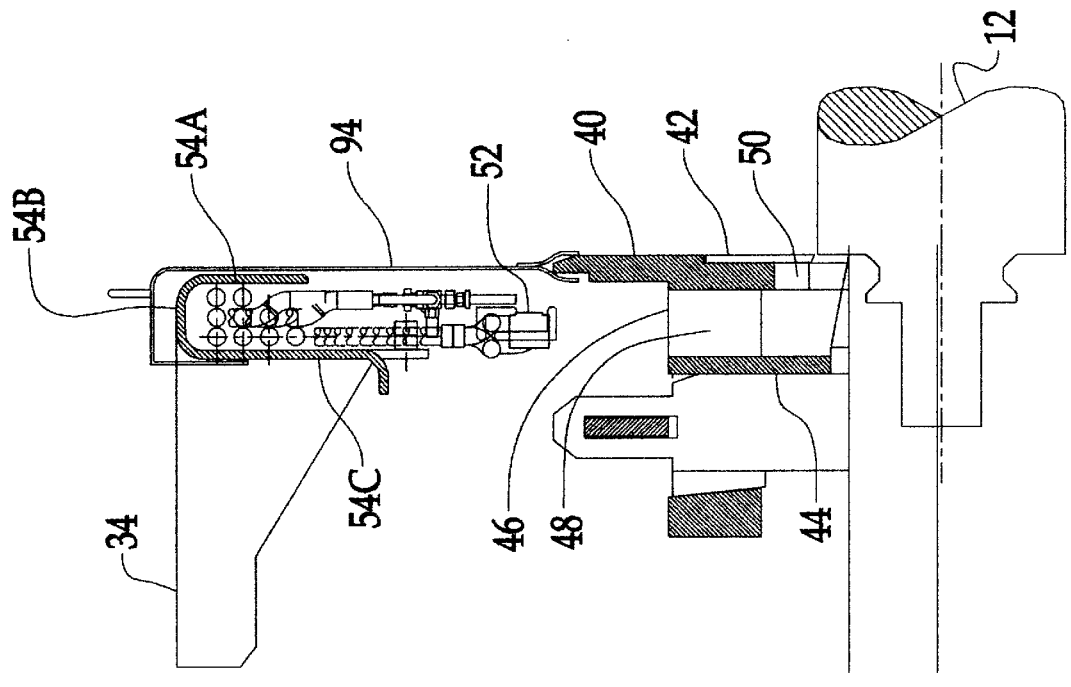
FIG. 7 is a view similar to FIG. 4 and illustrating the burner and utility lines in an inoperative position for servicing thereof.
Figure 10:
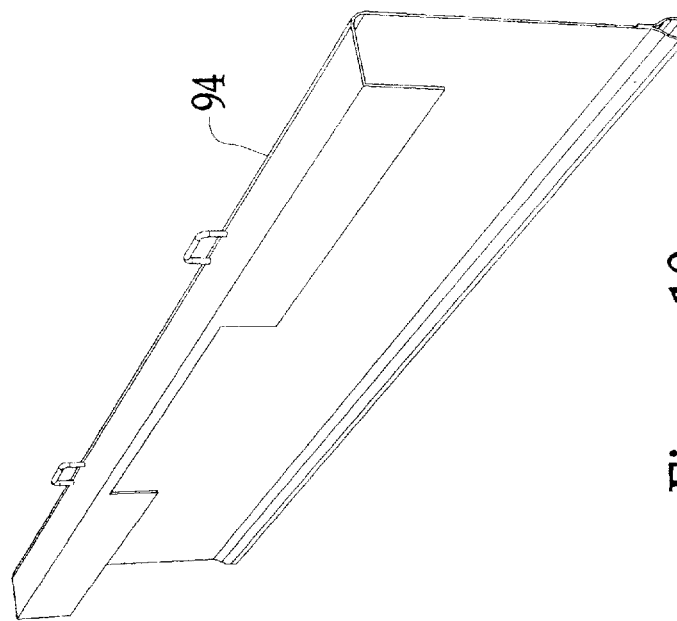
FIG. 10 is an isometric view of a shield to protect workmen when servicing burners according to the present invention.

As noted previously, an important feature of the preferred embodiment of the present invention is the groups of burners operatively supported in workpiece heating positions and held in positions for servicing of the burners by the discrete burner carriers 54 each independently supplied with utilities by power tracks 34A–34F. As shown in FIG. 2, three power tracks and associated discrete burner carriers are provided along each side guide. The number of such power tracks may be varied to suit a given installation requirement. It is intended that a sufficient number of power tracks and burner carriers be provided so that servicing of the group of burners in opposed burner carriers can be carried out without disturbing the flow of hot metallic workpieces between the side guides. It is further intended that a burner carrier in each side guide can be positioned for service without impeding heating of the opposed edge portions of the hot workpieces to offset heat loss before rolling in a hot mill or other form of hot workpiece processing operation. During the servicing operation, a shield 94 shown in FIGS. 7 and 10 is supported by the carrier in its elevated position and extends downwardly to the guide 20 for establishing a temporary barrier between a hot metallic workpiece advanced by the roller table between the side guide and the burners in the temporary position while carrying out the burner service operations. In this regard, the barriers protect workmen performing the servicing operations from intense heat and debris radiating from a hot metallic workpiece of the roller table during the normal operations thereof. The group of burners lifted along the utility pockets can be serviced without removal from a supporting relation by the side guide and enable the disconnecting of utility lines from one or more of the burners in service without the need to ease operation of the roller table and the hot metal processing downstream thereof.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim:

1. Apparatus to direct and restore heat losses to a hot metallic workpiece while advanced by a driven roller table, said apparatus including:

a beam section including an elongated horizontal guide extending along one side of a pass line for guiding a hot metallic workpiece, said beam section further including an elongated horizontal back section joined by web sections horizontally separated one from another by at least one utility pocket, said elongated horizontal guide having a window opening at said pass line communicating with said utility pocket;

a burner carrier supporting at least one burner connected to utility lines; and a drive to selectively position said burner between an operative position wherein said burner is aligned with said window opening to direct products of combustion from said burner for heating a side edge of a hot metallic workpiece while guided by said elongated horizontal guide and an inoperative position wherein said burner is raised to an elevated position by said drive above said window opening along said utility pocket for servicing of said burner.

2. The apparatus according to claim 1 wherein said drive operatively interconnects said elongated horizontal back section and said burner carrier.

3. The apparatus according to claim 1 wherein said drive includes a screw and nut.

4. The apparatus according to claim 1 wherein said drive includes an elongated screw rotatably supported by said burner carrier and a nut supported by said beam section for threaded engagement with said screw.

5. The apparatus according to claim 1 wherein said web sections are horizontally spaced one from another and sufficient in number to form a plurality of utility pockets, the utility pockets being separated by a web section and wherein said elongated horizontal guide section has a plurality of window openings each at said pass line and communicating with one of said plurality of utility pockets and wherein said burner carrier supports a burner connected to utility lines for each of said plurality of burner pockets.

6. The apparatus according to claim 5 further including wear plates supported by said horizontal guide section each extending between spaced apart utility pockets.

7. The apparatus according to claim 1 further including guide bars slidable in guide sockets for guiding said burner carrier between said operative position and said inoperative position.

8. The apparatus according to claim 7 wherein said guide bars depend downwardly from said burner carrier into cavities opening upwardly in upstanding projections from said web sections.

9. The apparatus according claim 1 wherein said burner carrier includes a top wall extending between spaced apart front and rear side walls forming an elongated horizontal cavity, said front wall engaged for support by said horizontal guide section and said back wall engaged for support by said horizontal back section.

10. The apparatus according to claim 9 wherein said elongated horizontal cavity communicates with each of said utility pockets for supporting utility lines extending to each burner of said plurality of burners.

11. The apparatus according to claim 9 wherein said rear side wall is connected to a power track assembly for supporting utility lines extending to said elongated horizontal cavity.

12. The apparatus according to claim 10 wherein said utility lines include conduit for supplying combustible gas, oxygen, air supply and return coolant water, and electrical ignition and flame monitor wiring.

13. The apparatus according to claim 1 further including releasable keepers for clamping said burner carrier to said beam section.

14. The apparatus according to claim 1 further including a shield supported by said beam section for extending upwardly to said burner carrier when in said elevated position, said shield extending horizontally along said beam section for isolating burners when in said elevated position from a hot metallic workpiece.

15. Apparatus to guide and restore heat losses to a hot metallic workpiece while advanced for a hot metal working operation, said apparatus including:
    side guides extending along opposite lateral sides of a driven roller table for guiding a hot metallic workpiece, each of said side guides being defined by a beam section including an elongated horizontal guide extending along one longitudinal side of a hot metallic workpiece, said beam section further including an elongated horizontal back section joined by web sections horizontally separated one from another by a plurality of utility pockets, said elongated horizontal guide having a window opening at said pass line communicating with each of said plurality of utility pockets;
    a drive for positioning said side guides adjacent opposite lateral sides of the hot metallic workpiece;
    a plurality of burner carriers each supporting a group of spaced apart burners with the burners of each group connected to discrete utility lines; and
    a drive to selectively position each of said plurality of burner carriers wherein the spaced apart burners of each group are aligned with corresponding ones of said window openings to direct products of combustion from said burners of each group for heating opposed lateral sides of a hot metallic workpiece while guided by said elongated horizontal guide and an inoperative position wherein said spaced apart burners of each group are raised to an elevated position by said drive above said window opening along said utility pockets for servicing of the burners of each of said group of burners.

16. The apparatus according claim 15 wherein said plurality of burner carriers each include a top wall extending between spaced apart front and rear side walls forming an elongated horizontal cavity, said front wall engaged for support by a horizontal guide section and said back wall engaged for support by a horizontal back section of a beam section of one of said side guides.

17. The apparatus according to claim 16 wherein said elongated horizontal cavity communicates with each of said utility pockets for supporting utility lines extending to said plurality of burners for a beam section of one of said side guides.

18. The apparatus according to claim 16 wherein said rear side wall is connected to a power track assembly for supporting utility lines extending to said elongated horizontal cavity.

19. The apparatus according to claim 16 wherein said utility lines include conduit for supplying combustible gas, oxygen, air supply and return coolant water, and electrical ignition and flame monitor wiring.

20. The apparatus according to claim 15 further including releasably keepers for clamping each of said plurality of burner carriers to one of said side guides.

21. The apparatus according to claim 15 further including a shield supported by said beam section for extending upwardly to sad burner carrier when in said elevated position, said shield extending horizontally along one of said plurality of said beam sections when in said elevated position for isolating said burners at said elevated position from a hot metallic workpiece.

22. A method for guiding and restoring heat losses in a hot metallic workpiece while advanced for a hot metal working operation, said method including the steps of:
    advancing a first hot metallic workpiece to an entrance between opposed side guides at an entry end of finishing a hot rolling mill;
    positioning the side guides in such close proximity to the opposed edges of the first workpiece to allow combustion products emitting from a plurality of burners exposed by window openings in each of said side guides to heat opposed side edges of the first hot metallic workpiece for offsetting heat losses from the opposed side edges before rolling in said hot rolling mill;
    processing the first hot metallic workpiece in said hot rolling mill;
    lifting a select group of burners along utility pockets in the associated side guide from the window openings therein for servicing the resulting elevated group of burners;
    advancing a second hot metallic workpiece to the entrance between the opposed side guides for processing in said hot rolling mill;
    heating opposed side edges of the second hot metallic workpiece by locating the side guides in such close proximity to the opposed edges of the second workpiece to cause combustion products emitting from said plurality of burners exposed by window openings in said side guides, except those burners comprising said select group of burners, to offset heat losses before rolling in said hot rolling mill; and
    lowering said select group of burners in the utility pockets in the associated side guide to register with the window openings therein for causing combustion products toward a side edge of the hot metallic workpiece.

23. The method according to claim 22 wherein after said step of lifting a select group of burners the method further including the step of installing a protective shield between said side guide and the selected group of burners to isolate the selected group from said second hot metallic workpiece, servicing the selected group of burners, and uninstalling said protective shield before said step of lowering the selected group of burners.

24. The method according to claim 22 including the further step of supporting said select group of burners on a carrier to form a top closure to the utility pockets in the side guide after said step of lowering the select group of burners.

* * * * *

UNITED STATES PATENT AND TRADEMARK OFFICE
CERTIFICATE OF CORRECTION

PATENT NO. : 5,937,688

DATED : 08/17/99

INVENTOR(S) : Secen et al.

It is certified that error appears in the above-identified patent and that said Letters Patent is hereby corrected as shown below:

Column 1, line 13, delete "piece" and insert --a metallic workpiece--

Column 1, line 17, after "servicing" insert --,--

Column 2, line 6, delete "of"

Column 2, line 40 and 44, change "dye" to --die--

Column 2, line 47, change "Acetylene" to --acetylene--

Column 3, line 36, delete "by" and insert --to a--

Column 3, line 52, delete "at" and insert --raised to--

Column 3, line 52, after "position" insert --by the drive--

Column 4, line 13, delete "at" and insert --raised to--

Column 4, line 13, after "position" insert --by the drive--

Column 4, line 19, delete "the" (second occurrence), and insert --and---

Column 4, line 21, delete "the" ( first occurrence), and insert --and--

UNITED STATES PATENT AND TRADEMARK OFFICE
CERTIFICATE OF CORRECTION

PATENT NO. : 5,937,688

DATED : 08/17/99

INVENTOR(S) : Secen et al.

It is certified that error appears in the above-identified patent and that said Letters Patent is hereby corrected as shown below:

Column 6, line 10, delete "as"

Column 6, line 30, please add the following sentence --The burner carriers 54 are each clamped to the beam section 22 by releasable keepers 54D.--

Column 6, line 34, delete "natural as" and insert --oxygen--

Column 6, line 46, delete "70" and insert --69--

Signed and Sealed this

Seventeenth Day of October, 2000

Attest:

Q. TODD DICKINSON

Attesting Officer

Director of Patents and Trademarks